(12) United States Patent
Delventhal et al.

(10) Patent No.: US 6,837,547 B2
(45) Date of Patent: Jan. 4, 2005

(54) VEHICLE OCCUPANT PROTECTION DEVICE INCLUDING AN END RELEASE BUCKLE ASSEMBLY

(75) Inventors: Neal H. Delventhal, Lake Orion, MI (US); Joseph J. Zwolinski, Warren, MI (US); Arnold J. Herberg, Davisburg, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 51 days.

(21) Appl. No.: 10/419,446

(22) Filed: Apr. 21, 2003

(65) Prior Publication Data

US 2004/0207246 A1 Oct. 21, 2004

(51) Int. Cl.⁷ .................. A62B 35/00; B60R 22/00; B60R 22/12
(52) U.S. Cl. ........................... 297/484; 297/467
(58) Field of Search ................... 297/484, 467

(56) References Cited

U.S. PATENT DOCUMENTS

| | | | | |
|---|---|---|---|---|
| 4,302,049 A | * | 11/1981 | Simpson | 297/484 |
| 4,809,410 A | | 3/1989 | Van Riesen | 24/579.11 |
| 5,125,718 A | * | 6/1992 | Czernakowski et al. | 297/484 |
| 5,398,997 A | * | 3/1995 | McFalls | 297/484 X |
| 5,899,534 A | * | 5/1999 | Gray | 297/484 |
| 5,908,223 A | * | 6/1999 | Miller | 297/484 |
| 5,971,492 A | * | 10/1999 | Pitman | 297/484 |
| 6,076,894 A | | 6/2000 | Busch | 297/484 |
| 6,139,111 A | | 10/2000 | Pywell et al. | 297/484 |
| 6,179,329 B1 | * | 1/2001 | Bradley | 297/484 X |
| 6,305,713 B1 | | 10/2001 | Pywell et al. | 297/484 X |
| 6,309,024 B1 | | 10/2001 | Busch | 297/484 |
| 6,367,882 B1 | * | 4/2002 | Van Druff et al. | 297/484 |
| 6,705,641 B2 | * | 3/2004 | Schneider et al. | 297/484 X |
| 2003/0034686 A1 | * | 2/2003 | Soderstrom et al. | 297/484 |

FOREIGN PATENT DOCUMENTS

| | | |
|---|---|---|
| DE | 7626542 | 12/1977 |
| DE | 3838789 A1 | 5/1990 |
| DE | 19505448 A1 | 8/1996 |
| EP | 0383473 A2 | 8/1990 |

OTHER PUBLICATIONS

Photographs illsutrating a seat abelt system publicly displayed at the North American International Auto Show in Detroit, Michigan Jan. 13–21, 2001.

* cited by examiner

Primary Examiner—Rodney B. White
(74) Attorney, Agent, or Firm—Tarolli, Sundheim, Covell & Tummino L.L.P.

(57) ABSTRACT

A vehicle occupant protection device (30) for helping to protect an occupant (18) of a seat (10) of a vehicle (14) includes first and second lap belt portions (32 and 34) for collectively extending across a lap portion of the occupant (18). The vehicle occupant protection device (30) also includes first and second shoulder belt portions (36 and 38) for extending over first and second shoulders, respectively, of the occupant (18). An end release buckle assembly (64) interconnects the first and second lap belt portions (32 and 34) and the first and second shoulder belt portions (36 and 38).

42 Claims, 7 Drawing Sheets

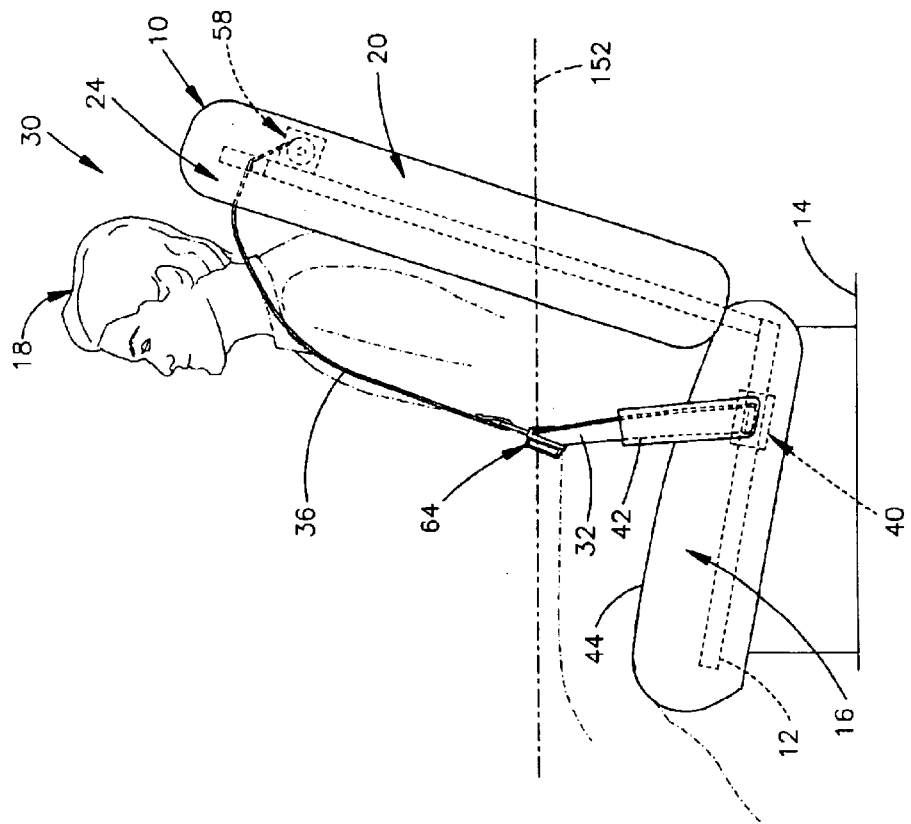
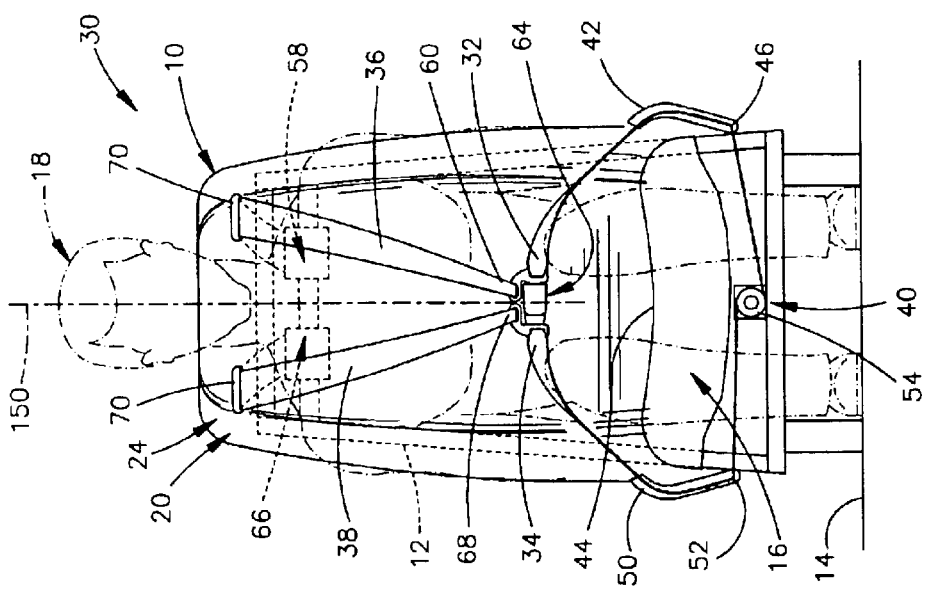

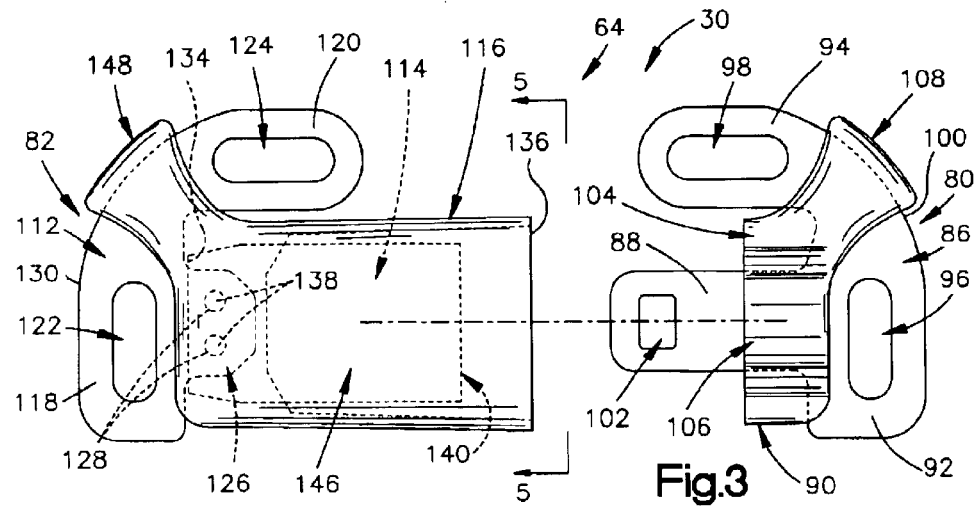
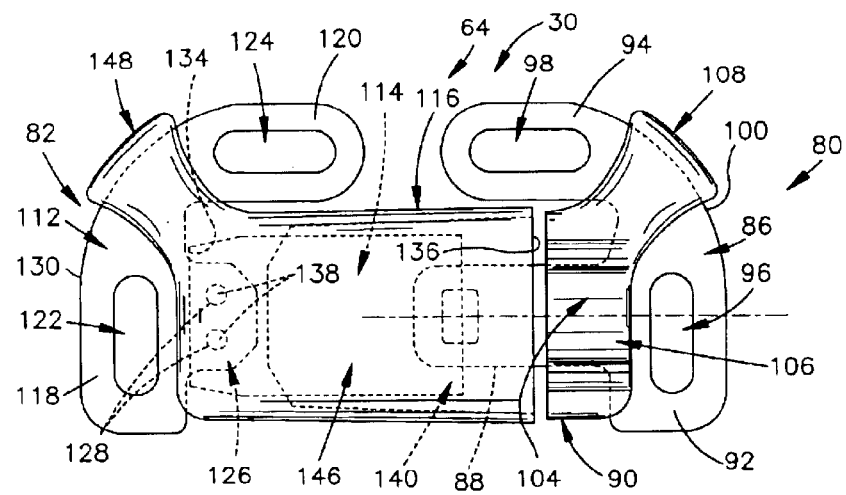
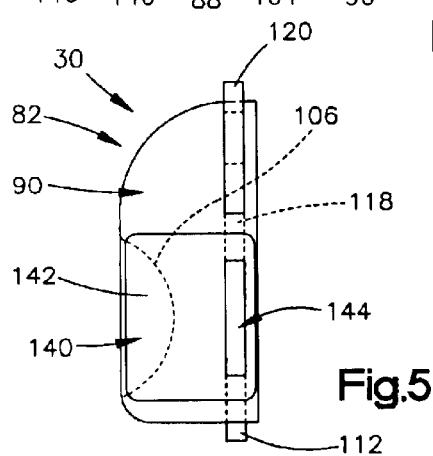

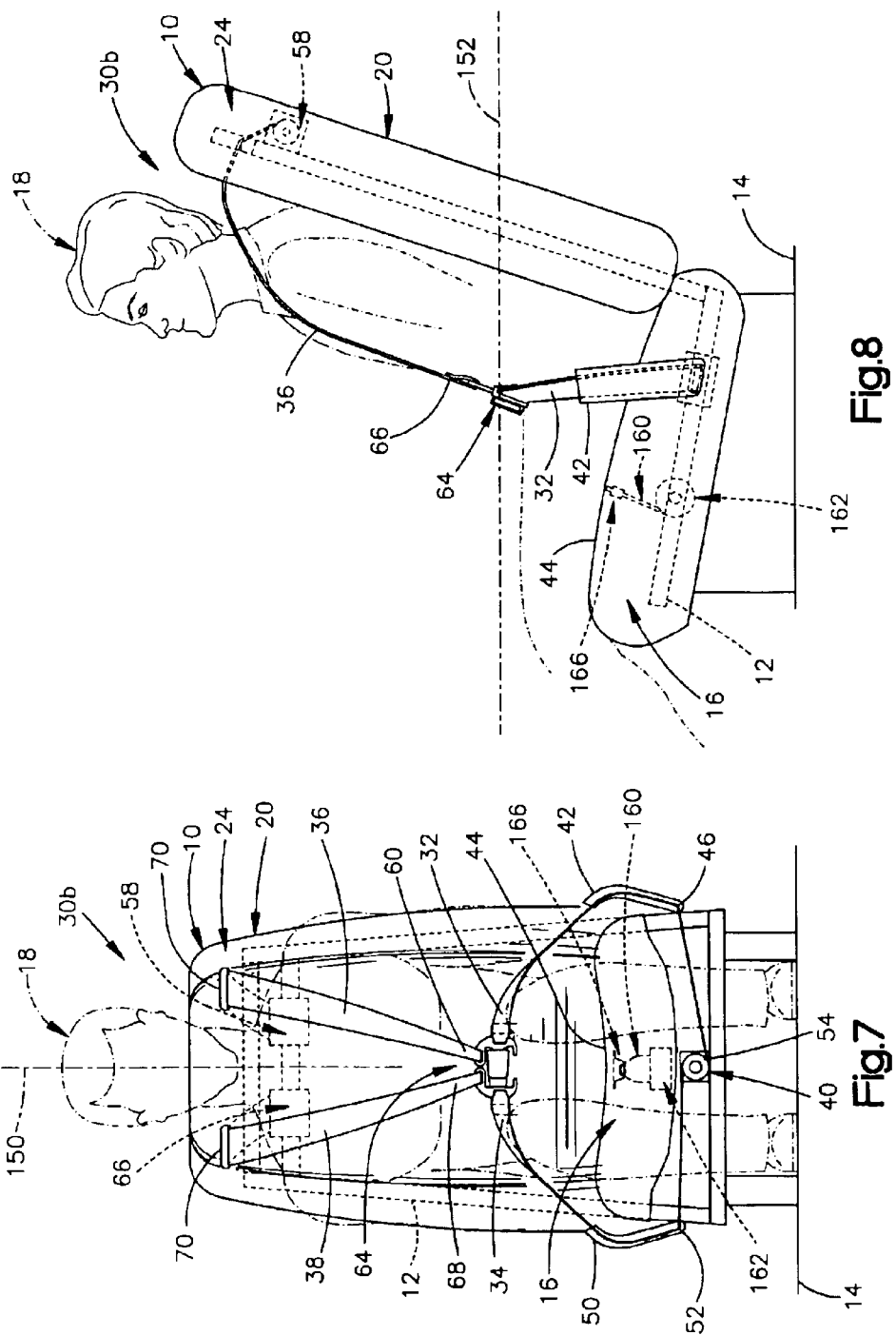

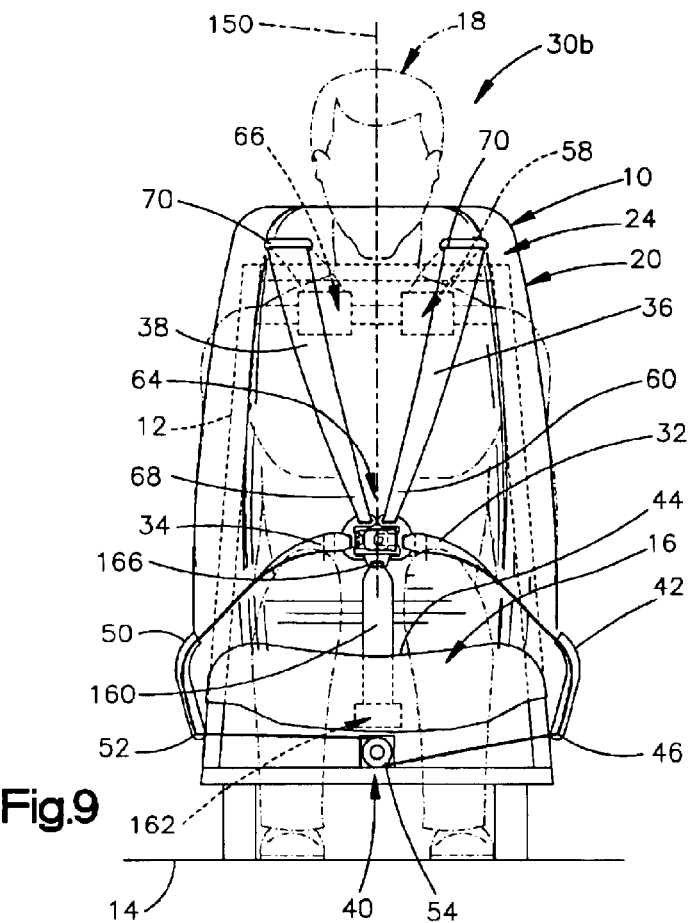
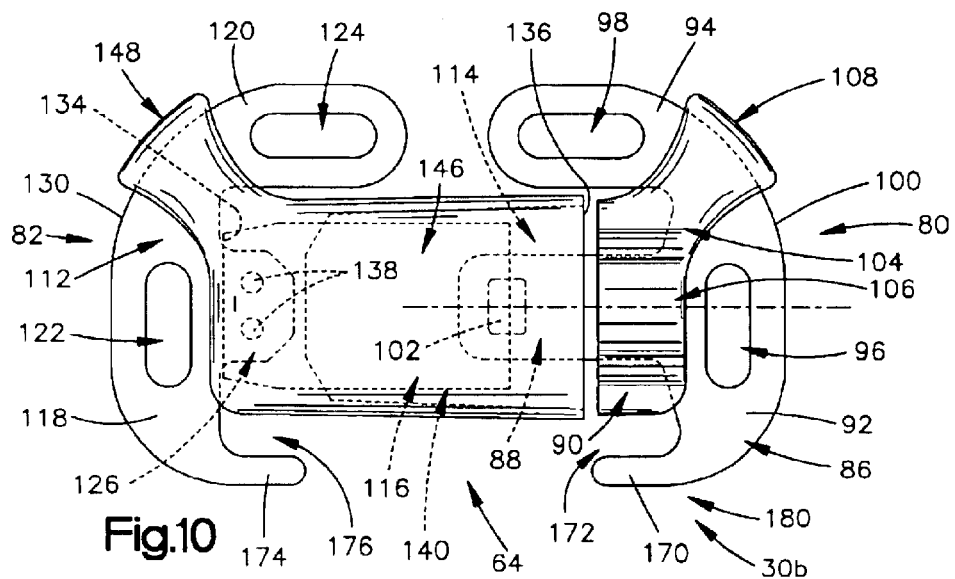

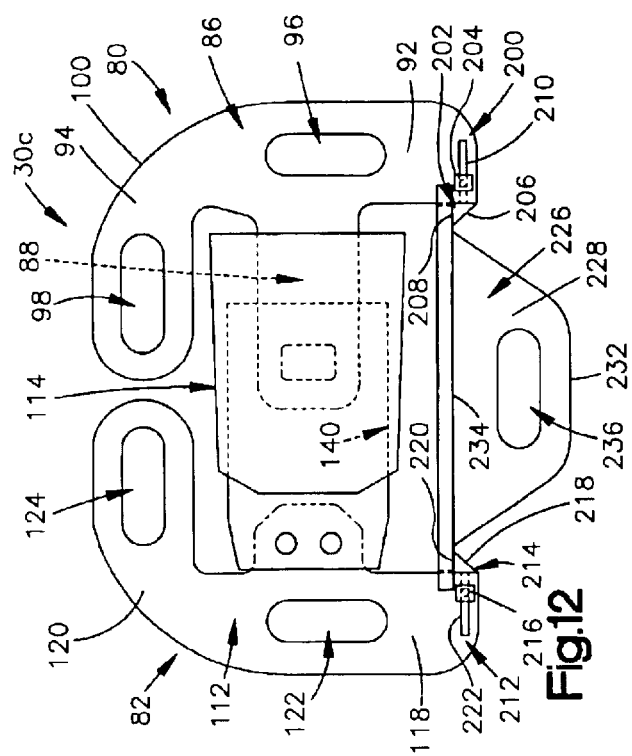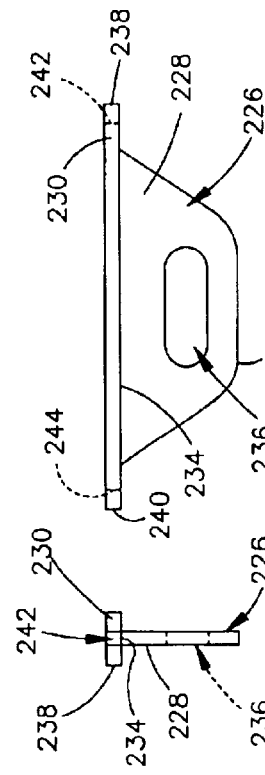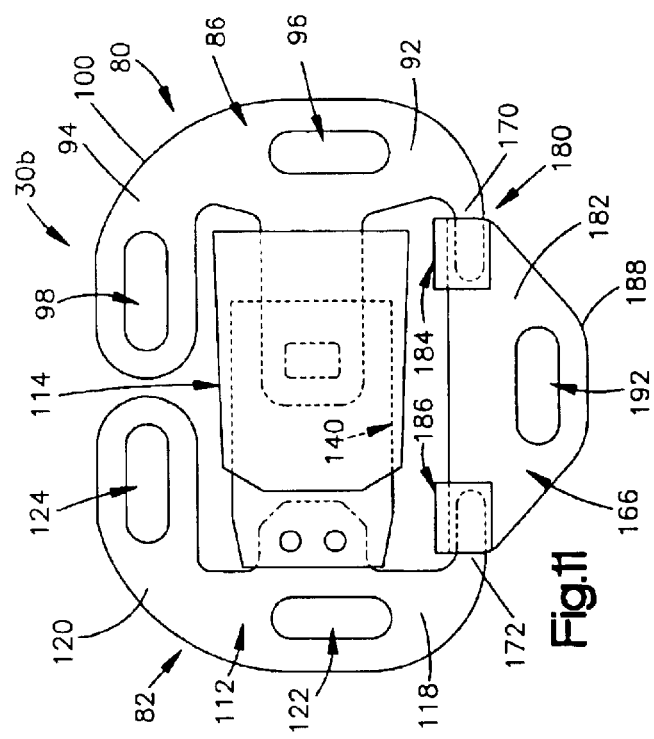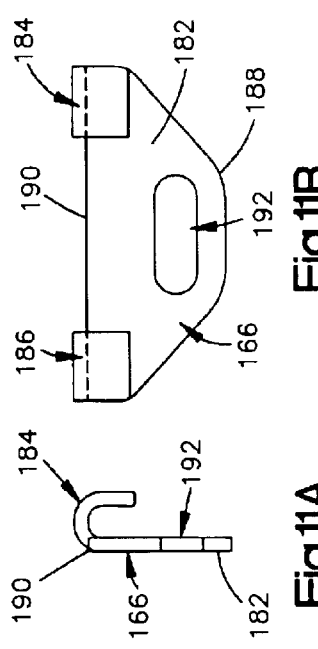

VEHICLE OCCUPANT PROTECTION DEVICE INCLUDING AN END RELEASE BUCKLE ASSEMBLY

TECHNICAL FIELD

The present invention relates to a vehicle occupant protection device for helping to protect an occupant of a seat of a vehicle.

BACKGROUND OF THE INVENTION

A known seat belt system includes two lap belts and two shoulder belts. One of the two lap belts extends from each side of the vehicle seat for extending partially across the lap of the occupant. Each of the lap belts has one end anchored to the vehicle and another end connected with a buckle assembly. The two shoulder belts extend from an upper portion of a vehicle seat. Each of the shoulder belts has one end connected with the vehicle and another end connected with the buckle assembly. The buckle assembly interconnects the shoulder belts and the lap belts.

SUMMARY OF THE INVENTION

The present invention relates to a vehicle occupant protection device for helping to protect an occupant of a seat of a vehicle. The vehicle occupant protection device comprises first and second lap belt portions for collectively extending across a lap portion of the occupant. The first lap belt portion extends from a first side of the seat and the second lap belt portion extends from a second side of the seat. The vehicle occupant protection device also comprises first and second shoulder belt portions for extending over first and second shoulders, respectively, of the occupant. The vehicle occupant protection device further comprises an end release buckle assembly for interconnecting the first and second lap belt portions and the first and second shoulder belt portions.

According to a second aspect, the present invention relates to a vehicle occupant protection device for helping to protect an occupant of a seat of a vehicle. The vehicle occupant protection device comprises first and second lap belt portions for collectively extending across a lap portion of the occupant. The first lap belt extends from a first side of the seat and the second lap belt extends from a second side of the seat. The vehicle occupant protection device also comprises first and second shoulder belt portions for extending over first and second shoulders, respectively, of the occupant. A buckle assembly interconnects the first and second lap belt portions and the first and second shoulder belt portions. The vehicle occupant protection device still further includes a crotch belt. A first end of the crotch belt is attached relative to the seat and a second end of the crotch belt is attached to a crotch belt attaching plate that includes structure for interlocking with the buckle assembly for securing the crotch belt to the buckle assembly.

According to another aspect, the present invention relates to a vehicle occupant protection device for helping to protect an occupant of a seat of a vehicle. The vehicle occupant protection device comprises first and second lap belt portions for collectively extending across a lap portion of the occupant. The first lap belt extends from a first side of the seat and the second lap belt extends from a second side of the seat. The vehicle occupant protection device also comprises first and second shoulder belt portions for extending over first and second shoulders, respectively, of the occupant. A buckle assembly interconnects the first and second lap belt portions and the first and second shoulder belt portions. The buckle assembly includes a buckle portion through which first and second slots extend and a tongue portion through which third and fourth slots extend. The first slot receives the first lap belt portion and the second slot receives the first shoulder belt portion. The third slot receives the second lap belt portion and the fourth slot receives the second shoulder belt portion. A direction of elongation of the second slot is angled relative to a direction of elongation of the first slot in a range of ninety-five to one hundred and twenty degrees. A direction of elongation of the fourth slot is angled relative to a direction of elongation of the third elongated slot by substantially the same angle.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 1 is a schematic illustration of a vehicle occupant protection device constructed in accordance with the present invention;

FIG. 2 is a schematic side view of the vehicle occupant protection device of FIG. 1;

FIG. 3 is an enlarged view of a buckle assembly of the vehicle occupant protection device of FIG. 1 illustrating a tongue portion of the buckle assembly separated from a buckle portion of the buckle assembly;

FIG. 4 is an enlarged view of the buckle assembly of the vehicle occupant protection device of FIG. 1 illustrating the tongue portion of the buckle assembly received and latched in the buckle portion of the buckle assembly;

FIG. 5 is a view taken along line 5—5 in FIG. 3;

FIG. 7 is a schematic illustration of a vehicle occupant protection device constructed in accordance with a third embodiment of the present invention and illustrating a crotch belt in a retracted position;

FIG. 8 is a schematic side view of the vehicle occupant protection device of FIG. 7;

FIG. 9 is a schematic illustration of the vehicle occupant protection device of FIG. 7 with the crotch belt secured to the buckle assembly;

FIG. 10 is an enlarged view of a buckle assembly of the vehicle occupant protection device of FIG. 7 illustrating a tongue portion of the buckle assembly received and latched in a buckle portion of the buckle assembly;

FIG. 11 is view of the buckle assembly of FIG. 10 with a crotch belt attaching plate secured to the buckle assembly;

FIG. 11A is a side view of the crotch belt attaching plate of FIG. 11;

FIG. 11B is a front view of the crotch belt attaching plate of FIG. 11;

FIG. 12 is an enlarged view of a buckle assembly for a vehicle occupant protection device constructed in accordance with a fourth embodiment of the present invention and illustrating a crotch belt attaching plate secured to the buckle assembly;

FIG. 12A is a side view of the crotch belt attaching plate of FIG. 12;

FIG. 12B is a front view of the crotch belt attaching plate of FIG. 12;

DETAILED DESCRIPTION OF THE INVENTION

Figure 6:
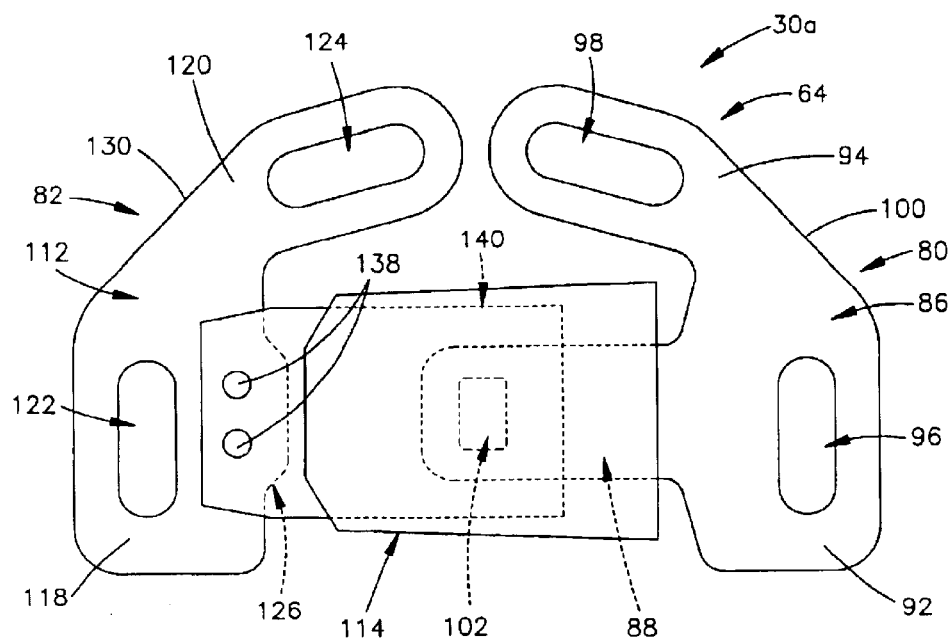
FIG. 6 is an enlarged view of a buckle assembly for a vehicle occupant protection device constructed in accordance with a second embodiment of the present invention.

FIG. 1 illustrates a vehicle seat 10. The seat 10 includes a frame 12 that is secured to the vehicle 14 in a known manner. The seat 10 also includes a cushion portion 16 upon which a vehicle occupant 18 sits and a backrest portion 20 that extends upwardly from the cushion portion. An upper portion 24 of the backrest portion 20 of the seat 10 is located adjacent the shoulders of the seated occupant 18.

FIG. 1 also illustrates a vehicle occupant protection device 30 constructed in accordance with the present invention. The vehicle occupant protection device 30 illustrated in FIG. 1 may be referred to as a "four-point seat belt system." The vehicle occupant protection device 30 includes lap belts 32 and 34 and shoulder belts 36 and 38. Each lap belt 32 and 34 extends over a portion of the lap of the occupant 18 so that lap belts 32 and 34 collectively extend across the occupant's lap. Each shoulder belt 36 and 38 extends over an associated shoulder of the occupant.

Lap belt 32 has an end that is connected to a lap belt retractor 40. The lap belt retractor 40 is mounted to the frame 12 of the seat 10 in a location below the cushion portion 16 of the seat. FIG. 1 illustrates a tubular lap belt guide 42 that is attached to the frame 12 on the left side of the seat 10. The tubular belt guide 42 provides a passage for lap belt 32 from a position adjacent a top surface 44 of the cushion portion 16 of the seat 10 to a position below the cushion portion. Preferably, the tubular belt guide 42 includes a D-ring (not shown) for supporting the lap belt 32 as it makes a turn, indicated at 46. Alternative structures for guiding the lap belt 32 to the lap belt retractor 40 may be used in place of the tubular belt guide 42.

Lap belt 34 also has an end that is connected to the lap belt retractor 40. A tubular belt guide 50 is attached to the right side of the seat 10. The tubular belt guide 50 is similar to the tubular belt guide 42. Preferably, the tubular belt guide 50 includes a D-ring (not shown) for supporting the lap belt 34 as it makes a turn, indicated at 52. Alternative structures for guiding the lap belt 34 to the lap belt retractor 40 may be used in place of the tubular belt guide 50.

The lap belt retractor 40 illustrated in FIG. 1 is a dual payout retractor and includes a single spool 54 for receiving both lap belts 32 and 34. As shown in FIG. 1, lap belt 32 extends from a lower side of the spool 54 and toward tubular belt guide 42. Lap belt 34 extends from an upper side of the spool 54 and toward tubular belt guide 50. Thus, rotation of the spool 54 in a clockwise direction, as viewed in FIG. 1, results in the retraction of both lap belts 32 and 34. Rotation of the spool 54 in a counterclockwise direction, as viewed in FIG. 1, permits the withdrawal of both lap belts 32 and 34.

As an alternative to a single lap belt retractor, the vehicle occupant protection device 30 may include two lap belt retractors, one for each of the lap belts 32 and 34. Also, lap belts 32 and 34 may be formed from opposite portions of a single length of webbing.

Each of the shoulder belts 36 and 38 of the vehicle occupant protection device 30 extends outwardly from the upper portion 24 of the backrest portion 20 of the seat 10. Shoulder belt 36 is associated with a left shoulder of the occupant 18, and shoulder belt 38 is associated with the right shoulder of the occupant.

Shoulder belt 36 has a first end (not shown) that is connected to a shoulder belt retractor 58. As shown in FIG. 2, the shoulder belt retractor 58 is mounted to the frame 12 of the backrest portion 20 of the seat 10. A second end 60 of shoulder belt 36 is attached to a buckle assembly 64. The buckle assembly 64 is discussed in detail below. When the occupant 18 is seated in the seat 10, as shown in FIGS. 1 and 2, shoulder belt 36 extends over the left shoulder of the occupant 18 and a portion of the shoulder belt 36 is wound about a spool of shoulder belt retractor 58. The withdrawn length of shoulder belt 36 is the length of shoulder belt 36 extending between the shoulder belt retractor 58 and the buckle assembly 64. Pulling on shoulder belt 36 to withdrawal the shoulder belt 36 from the shoulder belt retractor 58 adjusts the withdrawn length of shoulder belt 36.

Shoulder belt 38 has a first end (not shown) that is connected to a shoulder belt retractor 66. The shoulder belt retractor 66 is mounted to the frame 12 of the backrest portion 20 of the seat 10. A second end 68 of shoulder belt 38 is connected to the buckle assembly 64. When an occupant 18 is seated in the seat 10, as shown in FIG. 1, shoulder belt 38 extends over the right shoulder of the occupant 18 and a portion of shoulder belt 38 is wound about a spool of shoulder belt retractor 66. The withdrawn length of shoulder belt 38 is the length of shoulder belt 38 extending between the shoulder belt retractor 66 and the buckle assembly 64. Pulling on shoulder belt 38 to withdrawal the shoulder belt 38 from the shoulder belt retractor 66 adjusts the withdrawn length of shoulder belt 38.

A guide 70 is associated with each shoulder belt 36 and 38 for guiding the respective shoulder belt from its associated shoulder belt retractor 58 or 66 and out of the upper portion 24 of the backrest portion 20 of the seat 10. An elongated opening to each guide 70 is illustrated in FIG. 1.

FIGS. 3–5 illustrate the buckle assembly 64 of the vehicle occupant protection device 30. The buckle assembly 64 includes a tongue portion 80 and a buckle portion 82. FIG. 3 illustrates the tongue and buckle portions 80 and 82 separated from one another. FIG. 4 illustrates the tongue and buckle portions 80 and 82 secured together.

The tongue portion 80 of the buckle assembly 64 includes a belt attaching plate 86, a tongue 88, and a cover 90. The belt attaching plate 86 is preferably formed from metal and includes a lap belt attaching portion 92 and a shoulder belt attaching portion 94. The lap belt attaching portion 92 of the belt attaching plate 86 is generally planar. A slot 96 extends through the lap belt attaching portion 92 of the belt attaching plate 86. The slot 96 is elongated vertically, as illustrated in FIGS. 3 and 4. The slot 96 is adapted for receiving a portion of lap belt 32 for attaching lap belt 32 to the tongue portion 80 of the buckle assembly 64. Preferably, an end portion of the lap belt 32 is stitched into a loop and a portion of the loop extends through the slot 96 for attaching the lap belt 32 to the tongue portion 80 of the buckle assembly 64.

The shoulder belt attaching portion 94 of the belt attaching plate 86 of the tongue portion 82 extends upwardly from an upper end of the lap belt attaching portion 92. Preferably, a plane of the shoulder belt attaching portion 94 is angled at approximately thirty degrees relative to the plane of the lap belt attaching portion 92. A slot 98 extends through the shoulder belt attaching portion 94 of the belt attaching plate 86. The slot 98 is elongated laterally. The lateral direction is shown horizontally in FIGS. 3 and 4. The slot 98 is adapted for receiving a portion of shoulder belt 36 for attaching the shoulder belt 36 to the tongue portion 80 of the buckle assembly 64. Preferably, an end portion of the shoulder belt 36 is stitched into a loop and a portion of the loop extends through the slot 98 for attaching the shoulder belt 36 to the tongue portion 80 of the buckle assembly 64.

The belt attaching plate 86 of the tongue portion 80 also includes a curved outer edge 100. The curved outer edge 100 is located laterally opposite the tongue 88 on the lap belt attaching portion 92 of the belt attaching plate 86. The curved outer edge 100 also forms an upper edge of the shoulder belt attaching portion 94 of the belt attaching plate 86. The curved outer edge 100 is adapted to be received in the palm of the occupant's hand for enabling easy gripping of the tongue portion 80 of the buckle assembly 82.

The tongue 88 of the tongue portion 80 of the buckle assembly 64 extends laterally outwardly of the lap belt attaching portion 92 of the belt attaching plate 86, i.e., in the same direction as the shoulder belt attaching portion 94. The tongue 88 is coplanar with the lap belt attaching portion 92 of the belt attaching plate 86. The tongue 88 is elongated laterally and includes a latching aperture 102.

The tongue 88 and the belt attaching plate 86 of the tongue portion 80 of the buckle assembly 64 are formed from a single piece of material and not from multiple pieces of material secured together. Preferably, the tongue 88 and the belt attaching plate 86 are stamped from a single sheet of metal.

The cover 90 of the tongue portion 80 of the buckle assembly 64 is preferably formed from a lightweight metal or plastic material. The cover 90 includes a main portion 104 that extends over a portion of the tongue 88 and a portion of the lap belt attaching portion 92 of the belt attaching plate 86. A recess 106 extends laterally through the center of the main portion 104 of the cover 90. The cover 90 also includes a branch portion 108 that extends upwardly from the main portion 104 of the cover 90 at an angle of approximately forty-five degrees, as shown in FIGS. 3 and 4.

The cover 90 is adapted to snap fit onto the tongue 88 and belt attaching plate 86 of the tongue portion 80 of the buckle assembly 64. When attached to the tongue 88 and belt attaching plate 86, the main portion 104 of the cover 90 overlies the junction of the tongue 88 and the lap belt attaching portion 92 of the belt attaching plate 86. The branch portion 108 of the cover 90 overlies a portion of the shoulder belt attaching portion 94 of the belt attaching plate 86. The branch portion 108 of the cover 90 passes between the slots 96 and 98 of the belt attaching plate 86 of the tongue portion 80 of the buckle assembly 64.

The buckle portion 82 of the buckle assembly 64 includes a belt attaching plate 112, a buckle 114, and a cover 116. The belt attaching plate 112 is preferably formed from metal and includes a lap belt attaching portion 118 and a shoulder belt attaching portion 120. The lap belt attaching portion 118 of the belt attaching plate 112 is generally planar. A slot 122 extends through the lap belt attaching portion 118 of the belt attaching plate 112. The slot 122 is elongated vertically, as illustrated in FIGS. 3 and 4. The slot 122 is adapted for receiving a portion of lap belt 34 for attaching the lap belt 34 to the buckle portion 82 of the buckle assembly 64. Preferably, an end portion of the lap belt 34 is stitched into a loop and a portion of the loop extends through the slot 122 for attaching the lap belt 34 to the buckle portion 82 of the buckle assembly 64.

As shown in FIG. 5, the shoulder belt attaching portion 120 of the belt attaching plate 112 extends upwardly from an upper end of the lap belt attaching portion 118 and is located in the same plane as the lap belt attaching portion 118. A slot 124 extends through the shoulder belt attaching portion 120 of the belt attaching plate 112. The slot 124 is elongated laterally, as illustrated in FIGS. 3 and 4. The slot 124 is adapted for receiving a portion of shoulder belt 38 for attaching shoulder belt 38 to the buckle portion 82 of the buckle assembly 64. Preferably, an end portion of the shoulder belt 38 is stitched into a loop and a portion of the loop extends through the slot 124 for attaching the shoulder belt 38 to the buckle portion 82 of the buckle assembly 64.

A buckle attaching portion 126 of the belt attaching plate 112 extends laterally outwardly of the lap belt attaching portion 118 of the belt attaching plate, i.e., in the same direction as the shoulder belt attaching portion 120. The buckle attaching portion 126 is coplanar with the lap belt attaching portion 118 of the belt attaching plate 112. The buckle attaching portion 126 includes two vertically spaced apertures 128.

The belt attaching plate 112 of the buckle portion 82 of the buckle assembly 64 also includes a curved outer edge 130. The curved outer edge 130 is located laterally opposite the buckle attaching portion 126 on the lap belt attaching portion 118 of the belt attaching plate 112. The curved outer edge 130 also forms an upper edge of the shoulder belt attaching portion 120 of the belt attaching plate 112. The curved outer edge 130 is adapted to be received in the palm of the occupant's hand for enabling easy gripping of the buckle portion 82 of the buckle assembly 64.

The buckle 114 of the buckle portion 82 is elongated and has first and second ends 134 and 136, respectively. A first end 134 of the buckle 114 includes two vertically spaced apertures (not shown) that correspond to the apertures 128 in the buckle attaching portion 126 of the belt attaching plate 112. Two rivets 138, each of which passes through an aperture 128 in the buckle attaching portion 126 of the belt attaching plate 112 and an aperture in the first end 134 of the buckle 114, secure the buckle 114 to the buckle attaching portion 126 of the belt attaching plate 112.

The buckle 114 includes a latch mechanism (not shown) and a release mechanism, indicated by dashed box 140 in FIGS. 3 and 4. The latch mechanism operates in a known manner for latching the tongue 88 of the tongue portion 80 of the buckle assembly 64 in the buckle 114. The release mechanism 140 operates to release or unlatch the tongue 88 from the latching mechanism. The release mechanism 140 includes a push button actuator 142 (FIG. 5).

In the exemplary embodiment illustrated in FIG. 5, the push button actuator 142 is located on the second end 136 of the buckle 114 and is movable toward the first end 134 of the buckle for actuating the release mechanism 140 for unlatching the tongue 88. The push button actuator 142 includes an elongated slot 144 for receiving the tongue 88 of the tongue portion 80. The tongue 88 is adapted to pass through the elongated slot 144 in the push button actuator 142 and extend into the latch mechanism of the buckle 114. When the push button actuator 142 is moved linearly in the direction of insertion of the tongue 88, i.e., toward the first end 134 of the buckle 114, the release mechanism 140 is actuated to unlatch the tongue 88.

Alternatively, the push button actuator 142 may be located on the buckle 114 in a location other than on the second end 136 and movable in a direction parallel to a plane of the tongue 88 for unlatching the tongue from the latch mechanism of the buckle. For example, the push button actuation 142 may be located on an upper surface of the buckle 114, as viewed in FIG. 4, and movable downwardly in a direction parallel to the plane of the tongue 88 for unlatching the tongue. When the push button actuator 142 is located on the buckle 114 in a location other than on the second end 136, the second end 136 is provided with an elongated slot for receiving the tongue 88. A buckle 114 in which the push button actuation 142 is movable in a direction parallel to a plane of the tongue 88 for unlatching the tongue is referred to as an "end release buckle assembly."

The cover 116 of the buckle portion 82 of the buckle assembly 64 is preferably formed from a lightweight metal or plastic material. The cover 116 includes a main portion 146 that extends over the buckle 114 and a portion of the belt attaching plate 112. The cover 116 also includes a branch portion 148 that extends upwardly from the main portion 146 of the cover 116 at an angle of approximately forty-five degrees, as shown in FIGS. 3 and 4.

The cover 116 is adapted to snap fit onto the buckle 114 and the belt attaching plate 112 of the buckle portion 82 of the buckle assembly 64. When attached to the buckle 114 and belt attaching plate 112, the branch portion 148 of the cover 116 passes between the slots 122 and 124 of the belt attaching plate 112 of the buckle portion 82 of the buckle assembly 64.

FIG. 4 illustrates the tongue portion 80 of the buckle assembly 64 secured to the buckle portion 82 of the buckle assembly. To secure the tongue portion 80 to the buckle portion 82, the tongue 88 of the tongue portion 80 is inserted through the slot 144 of the push button actuator 142 of the buckle 114. The portion of the tongue 88 that includes the latching aperture 102 is received and latched in the latching mechanism of the buckle 114 of the buckle portion 82. When the tongue portion 80 of the buckle assembly 64 is secured to the buckle portion 82, the recess 106 in the main portion 104 of the cover 90 of the tongue portion 80 provides a path to the push button actuator 142 of the buckle assembly 82, as shown by the dashed line labeled 106 in FIG. 5.

With reference again to FIGS. 1 and 2, the buckle assembly 64 interconnects lap belts 32 and 34 and shoulder belts 36 and 38. When the occupant 18 is seated in the seat 10 and restrained by the vehicle occupant protection device 30 of the present invention, the shoulder belts 36 and 38 extend upwardly from the buckle assembly 64 at an angle in the range of five to thirty degrees relative an imaginary vertical line, indicated at 150 in FIG. 1, that extends through the buckle assembly 64. Additionally, the lap belts 32 and 34 extend downwardly from the buckle assembly 64 at an angle in the range of forty-five to ninety degrees from an imaginary horizontal line, indicated at 152 in FIG. 2, that extends through the buckle assembly 64 in a fore-and-aft direction of the vehicle 14. The occupant 18 illustrated in FIGS. 1 and 2 represents the fiftieth percentile male as defined by the Federal Motor Vehicle Safety Standards.

FIG. 6 is an enlarged view of a buckle assembly 64 for a vehicle occupant protection device 30a constructed in accordance with a second embodiment of the present invention. Structures of FIG. 6 that are the same or similar to structures of FIGS. 3–5 will be identified using the same reference numbers.

The buckle assembly 64 of FIG. 6 includes a tongue portion 80 and a buckle portion 82. The tongue portion 80 includes a belt attaching plate 86, a tongue 88, and a cover (not shown). The belt attaching plate 86 of the tongue portion 80 includes a lap belt attaching portion 92 having an elongated slot 96 and a shoulder belt attaching portion 94 having an elongated slot 98. The slot 96 extending through the lap belt attaching portion 92 is elongated vertically, as viewed in FIG. 6. The slot 98 extending through the shoulder belt attaching portion 94 is elongated and extends upwardly and laterally away from the slot 96 of the lap belt attaching portion 92 so that an angle in the range of ninety-five to 120 degrees is defined between the two slots. The angle of the slot 98 helps to direct shoulder belt 36, which extends through the slot 98, across the occupant's torso at an angle in the range of five to thirty degrees relative to an imaginary vertical line 150 that extends through the buckle assembly 64, as discussed with reference to FIG. 1.

The tongue 88 of the tongue portion 80 extends laterally outwardly of the lap belt attaching portion 92 and is located under, as shown in FIG. 6, the shoulder belt attaching portion 94. Thus, the slot 98 of the shoulder belt attaching portion 94 is angled relative to the tongue 88 at an angle in the range of five to thirty degrees. The belt attaching plate 86 of the tongue portion 80 includes an angled outer edge 100 that is adapted to fit into the palm of the occupant's hand.

The buckle portion 82 includes a belt attaching plate 112, a buckle 114, and a cover (not shown). The belt attaching plate 112 of the buckle portion 82 includes a lap belt attaching portion 118 having an elongated slot 122 and a shoulder belt attaching portion 120 having an elongated slot 124. The slot 122 extending through the lap belt attaching portion 118 is elongated vertically. The slot 124 extending through the shoulder belt attaching portion 120 is elongated and extends upwardly and laterally away from the slot 122 of the lap belt attaching portion 118 so that an angle in the range of ninety-five to 120 degrees is defined between the two slots. The angle of the slot 124 helps to direct shoulder belt 38, which extends through the slot 124, across the occupant's torso at an angle in the range of five to thirty degrees relative to an imaginary vertical line 150 that extends through the buckle assembly 64, as discussed with reference to FIG. 1.

The buckle 114 of the buckle portion 82 extends laterally outwardly of the lap belt attaching portion 118 and is located under, as shown in FIG. 6, the shoulder belt attaching portion 120. Fasteners, such as rivets 138, fixed the buckle 114 to the belt attaching plate 112. The buckle 114 illustrated in FIG. 6 is an end release buckle, as described above with reference to FIGS. 3–5.

The slot 124 extending through the shoulder belt attaching portion 120 extends relative to the buckle 114 at an angle in the range of five to thirty degrees. The belt attaching plate 112 of the buckle portion 82 includes an angled outer edge 130 that is adapted to fit into the palm of the occupant's hand.

FIG. 7 is a schematic illustration of a vehicle occupant protection device 30b constructed in accordance with a third embodiment of the present invention. Structures of FIG. 7 that are the same or similar to structures of FIGS. 3–5 are identified using the same reference numbers.

The vehicle occupant protection device 30b of FIG. 7 includes lap belts 32 and 34 for extending across the lap of an occupant 18 of a seat 10 of a vehicle 14. Lap belt 32 includes an end that is attached to a lap belt retractor 40 and an opposite end that is attached to a buckle assembly 64. The lap belt retractor 40 is mounted to a frame 12 of the seat 10 below the cushion portion 16 of the seat. A belt guide 42 helps to guide lap belt 32 from below the cushion portion 16 of the seat 10 to above the cushion portion of the seat.

Lap belt 34 includes an end that is attached to the lap belt retractor 40 and an opposite end that is attached to a buckle assembly 64. A belt guide 50 helps to guide lap belt 34 from below the cushion portion 16 of the seat 10 to above the cushion portion of the seat. As an alternative to both lap belts 32 and 34 being attached to the lap belt retractor 40, each lap belt 32 and 34 may have a separate lap belt retractor.

Shoulder belts 36 and 38 extend across a torso portion of the occupant 18. Shoulder belt 36 extends from an upper portion 24 of the backrest portion 20 of the seat 10 and over the left shoulder of the occupant 18. An end of shoulder belt 36 is attached to a shoulder belt retractor 58 and an opposite end 60 of the shoulder belt 36 is attached to the buckle assembly 64. The shoulder belt retractor 58 is mounted to the frame 12 in the backrest portion 20 of the seat 10.

Shoulder belt 38 extends from an upper portion 24 of the backrest portion 20 of the seat 10 and over the right shoulder of the occupant 18. An end of shoulder belt 38 is attached to a shoulder belt retractor 66 and an opposite end 68 of the shoulder belt 38 is attached to the buckle assembly 64. The shoulder belt retractor 66 is mounted to the frame 12 in the backrest portion 20 of the seat 10.

A crotch belt 160, shown in dashed lines in FIGS. 7 and B, is located in the cushion portion 16 of the seat 10. FIGS. 7 and 8 illustrate the crotch belt 160 in a fully retracted position. The crotch belt 160 includes an end (not shown) that is attached to a crotch belt retractor 162. An opposite end of the crotch belt 160 is attached to a crotch belt attaching plate 166. As will be discussed in detail below, the crotch belt attaching plate 166 is adapted to be secured to the buckle assembly 64.

As an alternative to providing a crotch belt retractor 162, one end of the crotch belt 160 may be fixed relative to the cushion portion 16 of the seat 10 and a position of the crotch belt attaching plate 166 relative to the crotch belt 160 may be manually adjustable for tightening and loosening the crotch belt. Additionally, a storage area (not shown) may be provided in the cushion portion 16 of the seat for storing the crotch belt 160 and the crotch belt attaching plate 166 when not in use.

The crotch belt retractor 162 is mounted on the frame 12 of the seat 10, as shown in FIG. 8. When the crotch belt 160 is in the fully retracted position, shown in FIGS. 7 and 8, the crotch belt attaching plate 166 is located below the top surface 44 of the cushion portion 16 of the seat 10. The crotch belt attaching plate 166 is adapted to be manually withdrawn from the seat cushion portion 16 and to be secured to the buckle assembly 64 so that the crotch belt 160 extends from the seat 10 to the buckle assembly 64 and through the crotch of the legs of the occupant 18. FIG. 9 illustrates the crotch belt 160 secured to the buckle assembly 64. The retractable crotch belt 160 enables the vehicle occupant protection device 30b of the present invention to be adaptable between a "four-point seat belt system" and a "five-point seat belt system."

FIG. 10 is an enlarged view of the buckle assembly 64 of the vehicle occupant protection device 30b of FIG. 7. The buckle assembly 64 is similar to the buckle assembly described above with reference to FIGS. 3–5. Thus, only features of the buckle assembly 64 of FIG. 10 that differ from the buckle assembly 64 of FIGS. 3–5 are discussed below.

The belt attaching plate 86 of the tongue portion 80 of the buckle assembly 64 includes a support protrusion 170 that extends laterally outward from the lap belt attaching portion 92. The support protrusion 170 extends outwardly of the lap belt attaching portion 92 in the same direction as the tongue 88. The support protrusion 170 is spaced below the tongue 88 and is spaced from the main portion 104 of the cover 90 such that a gap 172 is located between the support protrusion 170 and the cover 90.

The belt attaching plate 112 of the buckle portion 82 of the buckle assembly 64 includes a support protrusion 174 that extends laterally outward from the lap belt attaching portion 118. The support protrusion 174 extends outwardly of the lap belt attaching portion 118 in the same direction as the buckle 114. The support protrusion 174 is spaced below the buckle 114 and is spaced from the main portion 146 of the cover 116 such that a gap 176 is located between the support protrusion 174 and the cover 116.

When the tongue portion 80 of the buckle assembly 64 is secured to the buckle portion 82 of the buckle assembly, the support protrusions 170 and 174 align with one another, as shown in FIG. 10. The support protrusions 170 and 174 collectively form an interlocking portion 180 of the buckle assembly 64. The interlocking portion 180 of the buckle assembly 64 is adapted to secure the crotch belt attaching plate 166 relative to the buckle assembly 64.

FIG. 11 illustrates the crotch belt attaching plate 166 secured to the buckle assembly 64. A side view of the crotch belt attaching plate 166 is shown in FIG. 11A and a front view is shown in FIG. 11B. The crotch belt attaching plate 166 includes a belt attaching portion 182 and first and second interlocking portions 184 and 186, respectively. The belt attaching portion 182 of the crotch belt attaching plate 166 is planar and is defined between a curved lower edge 188 and a flat upper edge 190 (FIGS. 11A and 11B). A slot 192 extends through the belt attaching portion 182 near the curved lower edge 188. The crotch belt 160 extends through the slot 192 and is attached to the crotch belt attaching plate 166, as shown in FIG. 9. Preferably, an end portion of the crotch belt 160 is stitched into a loop and a portion of the loop extends through the slot 192 for attaching the crotch belt 160 to the crotch belt attaching plate 166.

The first and second interlocking portions 184 and 186 of the crotch belt attaching plate 166 are located at the intersections of the flat upper edge 190 and the curved lower edge 188 of the belt attaching portion 182. The first and second interlocking portions 184 and 186 are hooks that extend upwardly from the belt attaching portion 182 and then curve to extend downwardly in a direction parallel to the belt attaching portion, as shown in FIG. 11A. Each of the hooked first and second interlocking portions 184 and 186 is adapted for receiving a support protrusion 170 or 174 of the buckle assembly 64.

To secure the crotch belt attaching plate 166 to the buckle assembly 64, the tongue portion 80 of the buckle assembly 64 is secured to the buckle portion 82 of the buckle assembly. The crotch belt attaching plate 166 is manually withdrawn from the cushion portion 16 of the seat 10. The first and second interlocking portions 184 and 186 of the crotch belt attaching plate 166 are then positioned over the support protrusions 170 and 174 of the buckle assembly 64. Thus, a support protrusion 170 or 174 is received in each of the first and second interlocking portions 184 and 186. The crotch belt retractor 162 includes a rewind spring (not shown) that retracts the crotch belt 160 downward, as viewed in FIG. 9, so that the first and second interlocking portions 184 and 186 of the crotch belt attaching plate 166 interlock with the support protrusions 170 and 174 to secure the crotch belt 160 to the buckle assembly 64. When the crotch belt 160 is secured to the buckle assembly 64, the vehicle occupant protection device 30b secured about the occupant 18 is a "five point seat belt system."

To remove the crotch belt attaching plate 166 from the buckle assembly 64, the crotch belt attaching plate 166 is manually maneuvered so that an additional length of the crotch belt 160 is withdrawn from the crotch belt retractor 162. The crotch belt attaching plate 166 is then maneuvered so that the support protrusions 170 and 174 of the buckle assembly 64 are removed from the first and second interlocking portions 184 and 186 of the crotch belt attaching plate 166. The crotch belt retractor 162 then retracts the crotch belt 160 until the crotch belt attaching plate 166 is positioned below the top surface 44 of the cushion portion 16 of the seat 10. Thus, the crotch belt 160 may be removed from the buckle assembly 64 without unlatching the tongue portion 80 of the buckle assembly 64 from the buckle portion 82 of the buckle assembly. Alternatively, when the tongue portion 80 of the buckle assembly 64 is unlatched from the buckle portion 82 and is moved away from the buckle portion, the crotch belt attaching plate 166 is released from the buckle assembly 64.

FIG. 12 is an enlarged view of a buckle assembly 64 for a vehicle occupant protection device 30c constructed in accordance with a fourth embodiment of the present invention. The buckle assembly 64 of FIG. 12 is similar to the buckle assembly 64 described above with reference to FIGS. 7–11. Thus, only features of the buckle assembly 64 of FIG. 12 that differ from the buckle assembly 64 of FIGS. 7–11 are discussed below.

The belt attaching plate 86 of the tongue portion 80 of the buckle assembly 64 includes a latch bolt mechanism 200. The latch bolt mechanism 200 includes a latch bolt 202, a biasing spring (not shown), and an actuator 204. The latch bolt mechanism 200 is located in a housing (not shown) that is fixedly attached adjacent a lower edge of the lap belt attaching portion 92 of the belt attaching plate 86. The biasing spring is located within the housing and urges the latch bolt 202 leftward, as viewed in FIG. 12, so that a portion of the latch bolt 202 extends laterally outwardly from the lap belt attaching portion 92 in the same direction as the tongue 88. The portion of the latch bolt 202 that extends outward of the lap belt attaching portion includes a tapered lower surface 206 and a flat upper surface 208. The actuator 204 is fixed to the latch bolt 202 and extends through a slot 210 formed in the lap belt attaching portion 92 of the belt attaching plate 86. The actuator 204 is manually movable rightward, as viewed in FIG. 12, against the bias of the biasing spring to retract the portion of the latch bolt 202 into the housing.

The belt attaching plate 112 of the buckle portion 82 of the buckle assembly 64 also includes a latch bolt mechanism 212. The latch bolt mechanism 212 includes a latch bolt 214, a biasing spring (not shown), and an actuator 216. The latch bolt mechanism 212 is located in a housing (not shown) that is fixedly attached adjacent a lower edge of the lap belt attaching portion 118 of the belt attaching plate 112. The biasing spring is located within the housing and urges the latch bolt 214 rightward, as viewed in FIG. 12, so that a portion of the latch bolt 214 extends laterally outwardly from the lap belt attaching portion in the same direction as the buckle 114. The portion of the latch bolt 214 that extends outward of the lap belt attaching portion 118 includes a tapered lower surface 218 and a flat upper surface 220. The actuator 216 is fixed to the latch bolt 214 and extends through a slot 222 formed in the lap belt attaching portion 118 of the belt attaching plate 112. The actuator 216 is manually movable leftward, as viewed in FIG. 12, against the bias of the biasing spring to retract the portion of the latch bolt 214 into the housing.

FIG. 12 illustrates a crotch belt attaching plate 226 secured to the buckle assembly 64. A side view of the crotch belt attaching plate 226 is shown in FIG. 12A and a front view is shown in FIG. 12B. The crotch belt attaching plate 226 includes a belt attaching portion 228 and an interlocking portion 230. The belt attaching portion 228 of the crotch belt attaching plate 226 is planar and includes a curved lower edge 232 and a flat upper edge 234. A slot 236 extends through the belt attaching portion 228 near the curved lower edge 232. Although not shown, the crotch belt 160 extends through the slot 236 and is attached to the crotch belt attaching plate 226. Preferably, an end portion of the crotch belt 160 is stitched into a loop and a portion of the loop extends through the slot 236 for attaching the crotch belt 160 to the crotch belt attaching plate 226.

The interlocking portion 230 of the crotch belt attaching plate 226 is also planar. The interlocking portion 230 is attached to the upper edge 234 of the belt attaching portion 228 of the crotch belt attaching plate 226 and extends in a direction perpendicular to the belt attaching portion 228. The interlocking portion 230 includes first and second side edges 238 and 240, respectively. A first slot, indicated by dashed line 242 in FIG. 12B, extends into the first side edge 238 of the interlocking portion 230. A second slot, indicated by dashed line 244 in FIG. 12B, extends into the second side edge 240 of the interlocking portion 230. The first slot 242 is sized for receiving a portion of the lap belt attaching portion 92 of the belt attaching plate 86 of the tongue portion 80. The second slot 244 is sized for receiving a portion of the lap belt attaching portion 118 of the belt attaching plate 112 of the buckle portion 82.

To secure the crotch belt attaching plate 226 to the buckle assembly 614, the tongue portion 80 of the buckle assembly 64 is secured to the buckle portion 82 of the buckle assembly. The crotch belt attaching plate 226 is manually withdrawn from the cushion portion 16 of the seat 10. The first and second slots 242 and 244 of the interlocking portion 230 of the crotch belt attaching plate 226 are then positioned to receive respective portions of the belt attaching plates 86 and 112 of the tongue and buckle portions 80 and 82, respectively, of the buckle assembly 64. The crotch belt attaching plate 226 is moved upwardly, as viewed in FIG. 12, relative to the buckle assembly 64. As the crotch belt attaching plate 226 moves upwardly, the interlocking portion 230 of the crotch belt attaching plate 226 engages the tapered lower surfaces 206 and 218 of the latch bolts 202 and 214, respectively, and moves each latch bolt into its respective housing against the bias of its respective biasing spring. When the interlocking portion 230 of the crotch belt attaching plate 226 is located over the latch bolts 202 and 214, the latch bolts 202 and 214 are urged outwardly and the flat upper surfaces 208 and 220 of the latch bolts secure the crotch belt attaching plate 226 to the buckle assembly 64. The crotch belt retractor 162 includes a rewind spring (not shown) that retracts the crotch belt 160 downward, as viewed in FIG. 12, so that the interlocking portion 230 of the crotch belt attaching plate 226 engages the flat upper surfaces 208 and 220 of the latch bolts 200 and 214, respectively. When the crotch belt attaching plate 226 is secured to the buckle assembly 64, the vehicle occupant protection device 30c secured about the occupant is a "five point seat belt system."

To remove the crotch belt attaching plate 226 from the buckle assembly 64, the actuators 204 and 216 of the latching mechanisms 200 and 212, respectively, are manually moved to retract the latch bolts 202 and 214. When the latch bolts 202 and 214 are retracted, the crotch belt attaching plate 226 may be removed from the buckle assembly 64. Thus, the crotch belt attaching plate 226 of FIG. 12 may be removed from the buckle assembly 64 without unlatching the tongue portion 80 of the buckle assembly 64 from the buckle portion 82 of the buckle assembly. Alternatively, when the tongue portion 80 of the buckle assembly 64 is unlatched from the buckle portion 82 and is moved away from the buckle portion, the crotch belt attaching plate 226 is released from the buckle assembly 64.

Figure 13:
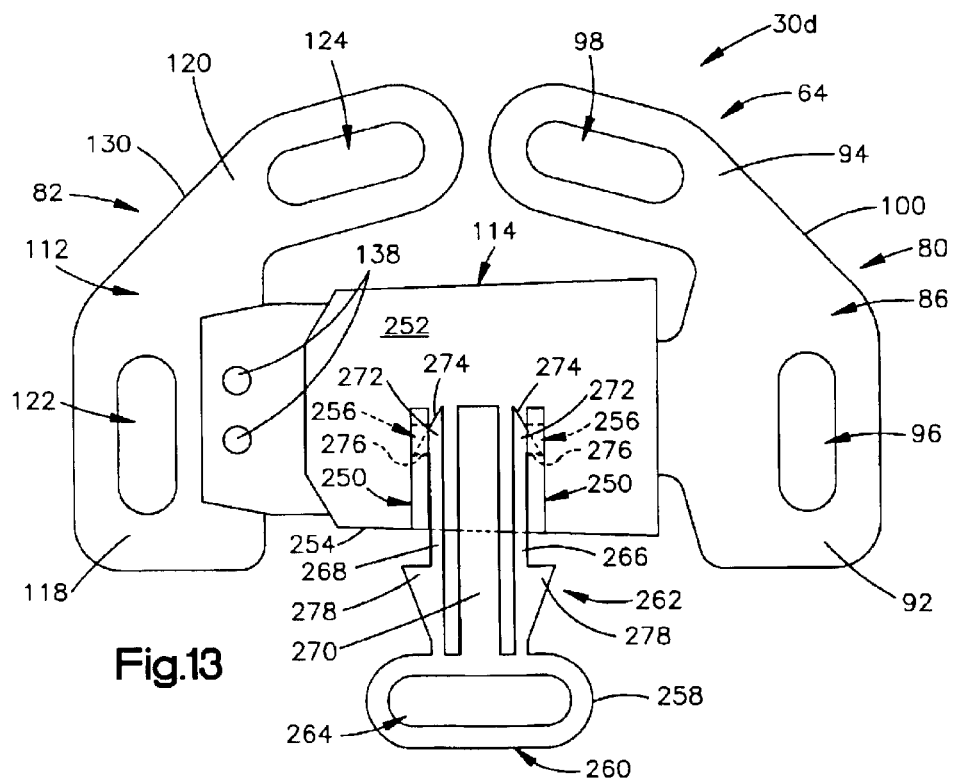
FIG. 13 is an enlarged view of a buckle assembly for a vehicle occupant protection device constructed in accordance with a fifth embodiment of the present invention and illustrating a crotch belt attaching plate secured to the buckle assembly.

FIG. 13 is an enlarged view of a buckle assembly 64 for a vehicle occupant protection device 30d constructed in accordance with a fifth embodiment of the present invention. The buckle assembly 64 of FIG. 13 is similar to the buckle assembly described above with reference to FIG. 6. Features of the buckle assembly 64 of FIG. 13 that are the same or similar to that of the buckle assembly 64 of FIG. 6 are identified using the same reference numbers. Additionally, features of the vehicle occupant protection device 30d that are the same as or similar to those illustrated in FIG. 7-11 are identified using the same reference numbers.

The buckle 114 of the buckle portion 82 of the buckle assembly 64 includes two elongated projections 250 that extend outward of the front surface 252 of the buckle 114. Alternatively, the projections 250 may extend outward of the rear surface of the buckle 114. The two elongated projections 250 extend upwardly, as viewed in FIG. 13, and parallel to one another and are spaced from one another by a predetermined space. The two projections 250 extend from a lower surface 254 of the buckle 114 to approximately a midpoint of the buckle. A laterally extending passage 256 extends through each of the projections 250 near an upper end of the projection. Although not shown in FIG. 13, a cover may extend over the two projections 250 and an opening in the cover may provide a passage to the predetermined space between the two projections.

The crotch belt attaching plate 258 includes a belt attaching portion 260 and an interlocking portion 262. The belt attaching portion 260 of the crotch belt attaching plate 258 is planar with an oval shape. A slot 264 extends through the belt attaching portion 260. Although not shown, the crotch belt 160 extends through the slot 264 and is attached to the crotch belt attaching plate 258. Preferably, an end portion of the crotch belt 160 is stitched into a loop and a portion of the loop extends through the slot 264 for attaching the crotch belt to the crotch belt attaching plate 258.

The interlocking portion 262 of the crotch belt attaching plate 258 extends upwardly, as viewed in FIG. 13, from the belt attaching portion 260. The interlocking portion 262 includes first and second locking arms 266 and 268, respectively, each of which is space from a central arm 270. The first and second locking arms 266 and 268 are elongated and terminate opposite the belt attaching portion 260 with locking members 272. Each locking member 272 includes a tapered surface 274 and a flat locking surface 276. Each locking arm 266 and 268 also includes a biasing lever 278 disposed near the belt attaching portion 260 of the crotch belt attaching plate 258.

The crotch belt attaching plate 258 of FIG. 13 is formed from a resilient material, such as fiberglass reinforced plastic. The spacing between the first and second locking arms 266 and 268 and the central arm 270 enables the first and second locking arms to flex toward the central arm.

To secure the crotch belt attaching plate 258 to the buckle 114, the crotch belt attaching plate 258 is manually withdrawn from the cushion portion 16 of the seat 10. The interlocking portion 262 of the crotch belt attaching plate 258 is then aligned with the space between the two projections 250 such that the tapered surface 274 of each locking member 272 engages an associated projection 250. The crotch belt attaching plate 258 is then pushed upwardly, as viewed in FIG. 13. When the crotch belt attaching plate 258 is pushed upwardly, the first and second locking arms 266 and 268 are biased inwardly against the central arm 270 and the interlocking portion 262 is received between the projections 250. When the locking member 272 of each locking arms 266 and 268 of the interlocking portion 262 of the crotch belt attaching plate 258 reaches the passages 256 in a respective projection 250, the locking arm 266 or 268 snaps outwardly. This causes the flat locking surface 276 of the locking member 272 to engage the associated projection 250 to secure the crotch belt attaching plate 258 to the buckle 114.

To remove the crotch belt attaching plate 258 from the buckle 114, the biasing levers 278 are manually pressed toward each other. The manual force exerted on the biasing levers 278 cause the first and second locking arms 266 and 268 to flex inwardly against the central arm 270 so that the flat locking surface 276 of each locking member 272 is moved away from its associated projection 250. The crotch belt attaching plate 258 is then pulled downwardly, as viewed in FIG. 13, and is removed from the buckle 114. Thus, the crotch belt attaching plate 258 of FIG. 13 may be removed from the buckle assembly 64 without unlatching the tongue portion 80 of the buckle assembly 64 from the buckle portion 82 of the buckle assembly.

Figure 14:
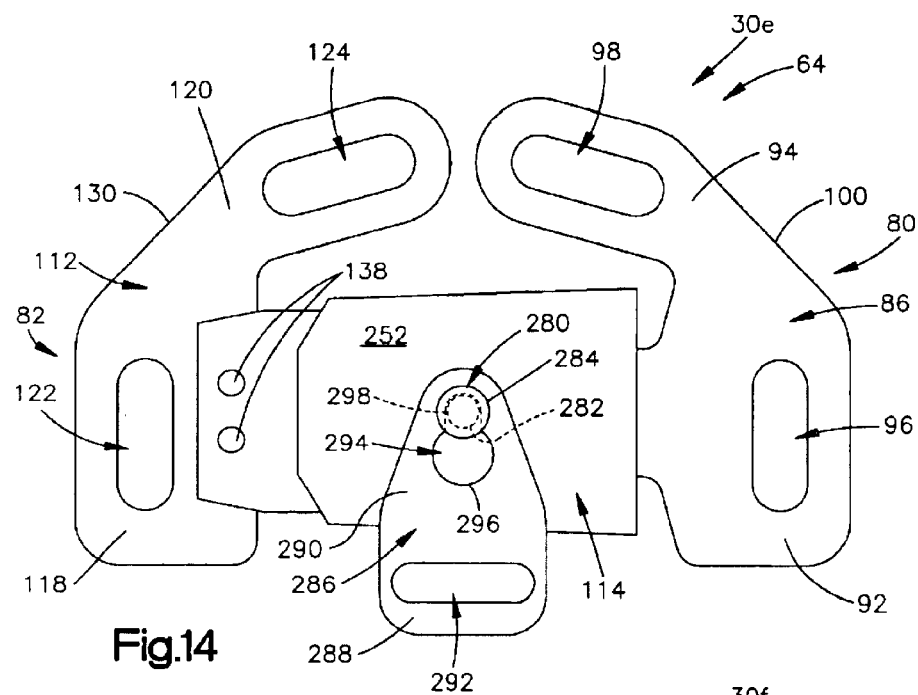
FIG. 14 is an enlarged view of a buckle assembly for a vehicle occupant protection device constructed in accordance with a sixth embodiment of the present invention and illustrating a crotch belt attaching plate secured to the buckle assembly.

FIG. 14 is an enlarged view of a buckle assembly 64 for a vehicle occupant protection device 30e constructed in accordance with a sixth embodiment of the present invention. The buckle assembly 64 of FIG. 14 is similar to the buckle assembly 64 described above with reference to FIG. 13. Thus, only features of the buckle assembly of FIG. 14 that differ from the buckle assembly of FIG. 13 are discussed below. The buckle 114 of the buckle portion 82 of the buckle assembly 64 includes a locking pin 280 that extends outwardly of a front surface 252 of the buckle 114. The locking pin 280 includes a neck portion, shown by dashed lines at 282, and a head portion 284. The head portion 284 of the locking pin 280 is larger in diameter than the neck portion 282.

The crotch belt attaching plate 286 includes a belt attaching portion 288 and an interlocking portion 290. The belt attaching portion 288 of the crotch belt attaching plate 286 is planar. A slot 292 extends through belt attaching portion 288. Although not shown, the crotch belt 160 extends through the slot 292 and is attached to the crotch belt attaching plate 286. Preferably, an end portion of the crotch belt 160 is stitched into a loop and a portion of the loop extends through the slot 292 for attaching the crotch belt 160 to the crotch belt attaching plate 286.

The interlocking portion 290 of the crotch belt attaching plate 286 is coplanar with the belt attaching portion 288. An aperture 294 extends through the interlocking portion 290 of the crotch belt attaching plate 286. The aperture 294 includes a larger diameter portion 296 and a smaller diameter portion 298. The larger diameter portion 296 of the aperture 294 is larger than the diameter of the head portion 284 of the locking pin 280. The smaller diameter portion 298 of the aperture 294 is smaller than the diameter of the head portion 284 of the locking pin 280 and larger than the diameter of the neck portion 282 of the locking pin.

Preferably, the interlocking portion 290 and the belt attaching portion 288 of the crotch belt attaching plate 286 are formed from a single piece of material and not from multiple pieces of material secured together. Preferably, the crotch belt attaching plate 286 is stamped from a single piece of metal.

To secure the crotch belt attaching plate 286 to the buckle 114, the crotch belt attaching plate 286 is manually withdrawn from the cushion portion 16 of the seat 10. The larger diameter portion 296 of the aperture 294 in the interlocking portion 290 of the crotch belt attaching plate 286 is maneuvered to receive the head portion 284 of the locking pin 280. The crotch belt attaching plate 286 then is moved downward so that the neck portion 282 of the locking pin 280 is received in the smaller diameter portion 298 of the aperture 294 in the interlocking portion 290 of the crotch belt attaching plate 286 to secure the crotch belt attaching plate to the buckle 114, as shown in FIG. 14.

To remove the crotch belt attaching plate 286 from the buckle 114, the crotch belt attaching plate 286 is moved upwardly until the neck portion 282 of the locking pin 280 is received in the larger diameter portion 296 of the aperture 294 in the interlocking portion 290 of the crotch belt attaching plate 286. The crotch belt attaching plate 286 is maneuvered so that the head portion 284 of the locking pin 280 is removed from the larger diameter portion 296 of the aperture 294 of the interlocking portion 290 of the crotch belt attaching plate 286. Thus, the crotch belt attaching plate 286 of FIG. 13 may be removed from the buckle assembly 64 without unlatching the tongue portion 80 of the buckle assembly from the buckle portion 82 of the buckle assembly.

Figure 15:
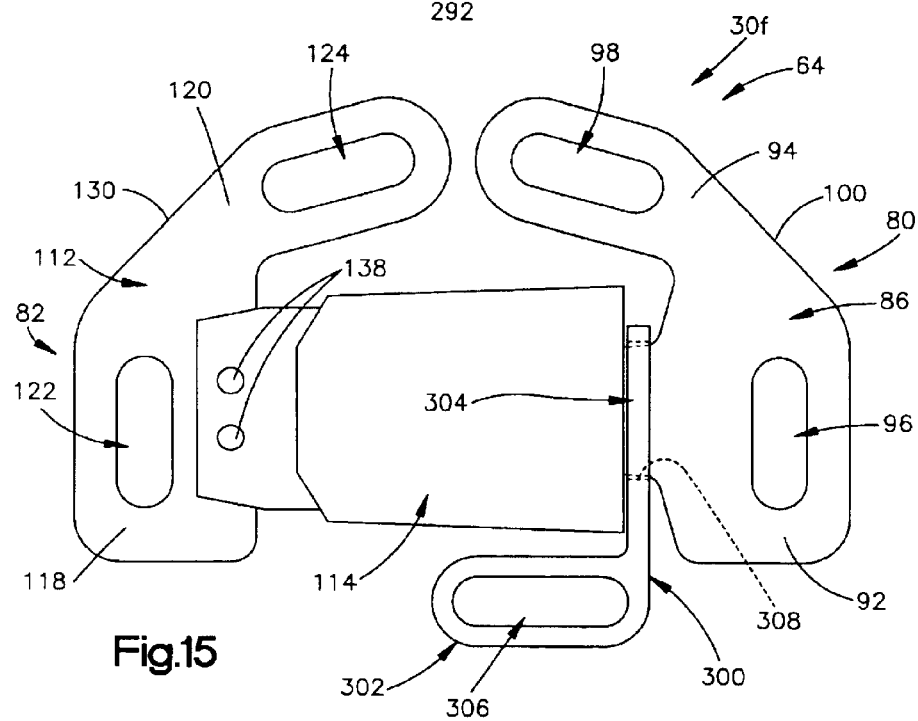
FIG. 15 is an enlarged view of a buckle assembly for a vehicle occupant protection device constructed in accordance with a seventh embodiment of the present invention and illustrating a crotch belt attaching plate secured to the buckle assembly.

FIG. 15 is an enlarged view of a buckle assembly 64 for a vehicle occupant protection device 30*f* constructed in accordance with a seventh embodiment of the present invention. The buckle assembly 64 of FIG. 15 is similar to the buckle assembly 64 described above with reference to FIG. 6. Additionally, features of the vehicle occupant protection device 30*f* that are the same as or similar to those illustrated in FIGS. 7–9 are identified using the same reference numbers.

The crotch belt attaching plate 300 of the vehicle occupant protection device 30*f* includes a belt attaching portion 302 and an interlocking portion 304. The belt attaching portion 302 is planar with an oval shape. A slot 306 extends through the belt attaching portion 302. Although not shown, the crotch belt 160 extends through the slot 306 and is attached to the crotch belt attaching plate 300. Preferably, an end portion of the crotch belt 160 is stitched into a loop and a portion of the loop extends through the slot 306 for attaching the crotch belt 160 to the crotch belt attaching plate 300.

The interlocking portion 304 of the crotch belt attaching plate 300 is planar and extends upwardly from and perpendicular to the belt attaching portion 302. An elongated slot, illustrated at 308 in FIG. 15, extends through the interlocking portion 304 of the crotch belt attaching plate 300. The elongated slot 308 is sized for receiving the tongue 88 of the tongue portion 80 of the buckle assembly 64.

To secure the crotch belt attaching plate 300 to the buckle assembly 64, the crotch belt attaching plate 300 is manually withdrawn from the cushion portion 16 of the seat 10. The tongue 88 of the tongue portion 80 of the buckle assembly 64 is inserted through the elongated slot 308 in the interlocking portion 304 of the crotch belt attaching plate 300. The tongue 88 is then inserted into the buckle 114 and is latched in the buckle for securing the crotch belt attaching plate 300 to the buckle assembly 64.

To remove the crotch belt attaching plate 300 from the buckle assembly 64, the buckle assembly 64 is unlatched and the crotch belt attaching plate 300 is removed from the tongue 88. Thus, the crotch belt attaching plate 300 of FIG. 13 may not be removed from the buckle assembly 64 without unlatching the tongue portion 80 of the buckle assembly from the buckle portion 82 of the buckle assembly.

From the above description of the invention, those skilled in the art will perceive improvements, changes and modifications. For example, lap belt 32 and shoulder belt 36 may be attached to the buckle portion 82 of the buckle assembly 64 and lap belt 34 and shoulder belt 38 attached to the tongue portion 80. Such improvements, changes and modifications within the skill of the art are intended to be covered by the appended claims.

Having described the invention, we claim the following:

1. A vehicle occupant protection device for helping to protect an occupant of a seat of a vehicle, the vehicle occupant protection device comprising:

first and second lap belt portions for collectively extending across a lap portion of the occupant, the first lap belt extending from a first side of the seat and the second lap belt extending from a second side of the seat;

first and second shoulder belt portions for extending over first and second shoulders, respectively, of the occupant; and a buckle assembly for interconnecting the first and second lap belt portions and the first and second shoulder belt portions, the buckle assembly including a buckle portion and a tongue portion, the tongue portion including a laterally extending tongue and the buckle portion including a buckle for receiving and latching the tongue of the tongue portion for securing the tongue portion to the buckle portion, the tongue being inserted into the buckle in a first direction for the buckle to receive and latch the tongue, the buckle including a release mechanism that is actuatable for unlatching the tongue from the buckle, the release mechanism including a push button actuator that moves linearly in the first direction for actuating the release mechanism to unlatch the tongue from the buckle.

2. The vehicle occupant protection device of claim 1 wherein the push button actuator defines an end of the buckle, the push button actuator including an opening through which the tongue is moved during insertion of the tongue into the buckle.

3. The vehicle occupant protection device of claim 1 wherein the buckle portion of the buckle assembly further includes a first belt attaching plate that is fixed relative to the buckle, the first lap belt portion and the first shoulder belt portion being attached to the first belt attaching plate, the tongue portion of the buckle assembly further including a second belt attaching plate that is fixed relative to the tongue, the second lap belt portion and the second shoulder belt portion being attached to the second belt attaching plate.

4. The vehicle occupant protection device of claim 3 wherein the tongue portion, including the tongue and the second belt attaching plate, is formed from a single piece of material and not from multiple pieces of material secured together.

5. The vehicle occupant protection device of claim 3 wherein the buckle of the buckle portion extends laterally outwardly of the first belt attaching plate, an end of the buckle located laterally opposite the first belt attaching plate including the push button actuator, the push button actuator being moved laterally toward the first belt attaching plate for actuating the release mechanism of the buckle to unlatch the tongue from the buckle.

6. The vehicle occupant protection device of claim 3 wherein first and second slots extend through the first belt attaching plate of the buckle portion, the first slot for receiving the first lap belt portion and the second slot for receiving the first shoulder belt portion, third and fourth slots extending through the second belt attaching plate of the tongue portion, the third slot for receiving the second lap belt portion and the fourth slot for receiving the second shoulder belt portion.

7. The vehicle occupant protection device of claim 6 wherein, when the tongue portion is secured to the buckle portion, the first slot of the buckle portion extends in a direction parallel to the third slot of the tongue portion.

8. The vehicle occupant protection device of claim 6 wherein the second slot of the buckle portion and the fourth slot of the tongue portion are elongated and, when the tongue portion is secured to the buckle portion, an axis of elongation of the second slot is coaxial with an axis elongation of the fourth slot.

9. The vehicle occupant protection device of claim 6 wherein the first and second slots are elongated and the second slot is fixed relative to and extends away from the first slot in a direction such that an angle in a range of ninety-five to one hundred and twenty degrees is defined between the first and second slots, the third and fourth slots also being elongated and the fourth slot being fixed relative to and extending away from the third slot in a direction such that substantially the same angle is defined between the third and fourth slots.

10. The vehicle occupant protection device of claim 1 wherein the first and second shoulder belt portions are adapted to extend upwardly from the buckle assembly, when the tongue is latched in the buckle and the occupant is secured by the belt portions, at an angle in a range of five to thirty degrees from an imaginary vertical reference line that extends through the buckle assembly.

11. The vehicle occupant protection device of claim 10 wherein the first and second lap belt portions are adapted to extend downwardly from the buckle assembly, when the tongue is latched in the buckle, at an angle in a range of forty-five to ninety degrees from an imaginary horizontal reference line that extends through the buckle assembly in a longitudinal direction relative to the vehicle.

12. The vehicle occupant protection device of claim 1 wherein the buckle portion includes a buckle cover that overlies and protects the buckle.

13. The vehicle occupant protection device of claim 1 wherein the tongue portion of the buckle assembly includes a cover, the cover including a laterally extending groove for aligning with the push button actuator of the release mechanism of the buckle portion when the tongue portion of the buckle assembly is secured to the buckle portion.

14. The vehicle occupant protection device of claim 1 further including a crotch belt, a first end of the crotch belt being attached relative to the seat and a second end of the crotch belt being attached to a crotch belt attaching plate that includes structure for interlocking with the buckle assembly for securing the crotch belt to the buckle assembly.

15. The vehicle occupant protection device of claim 14 wherein the structure of the crotch belt attaching plate defines an opening for receiving the tongue of the tongue portion of the buckle assembly prior to the tongue being received and latched in the buckle, the structure securing the crotch belt attaching plate to the buckle assembly when the tongue is latched in the buckle.

16. The vehicle occupant protection device of claim 14 wherein the buckle assembly includes first and second belt attaching plates, the buckle portion including the first belt attaching plate and the tongue portion including the second belt attaching plate, the structure of crotch belt attaching plate including a plate portion having first and second slots, the first slot adapted to receive a portion of the first belt attaching plate and the second slot adapted to receive a portion of the second belt attaching plate for securing the crotch belt attaching plate to the buckle assembly.

17. The vehicle occupant protection device of claim 16 wherein the first and second belt attaching plates include locking mechanisms for locking the crotch belt attaching plate relative to the buckle assembly, the locking mechanisms being actuatable for releasing the crotch belt attaching plate from the buckle assembly.

18. The vehicle occupant protection device of claim 14 wherein the buckle assembly includes first and second belt attaching plates, the buckle portion including the first belt attaching plate having a first protrusion, the tongue portion including the second belt attaching plate having a second protrusion, the structure of crotch belt attaching plate including at least one hooked portion for extending over the first and second protrusions for securing the crotch belt attaching plate to the buckle assembly.

19. The vehicle occupant protection device of claim 14 wherein the buckle of the buckle assembly includes an interlocking portion, the structure of the crotch belt attaching plate includes a corresponding interlocking portion for cooperating with the interlocking portion of the buckle for securing the crotch belt attaching plate to the buckle assembly.

20. The vehicle occupant protection device of claim 19 wherein the interlocking portion of the buckle includes a passageway, the corresponding interlocking portion of the crotch belt attaching plate including at least one locking arm that is adapted to be received and latched in the passageway of the buckle for securing the crotch belt attaching plate to the buckle assembly.

21. A vehicle occupant protection device for helping to protect an occupant of a seat of a vehicle, the vehicle occupant protection device comprising:

first and second lap belt portions for collectively extending across a lap portion of the occupant, the first lap belt extending from a first side of the seat and the second lap belt extending from a second side of the seat;

first and second shoulder belt portions for extending over first and second shoulders, respectively, of the occupant;

a buckle assembly for interconnecting the first and second lap belt portions and the first and second shoulder belt portions, the buckle assembly including a buckle portion having a first belt attaching plate through which first and second slots extend and a tongue portion having a second belt attaching plate through which third and fourth slots extend, the first belt attaching plate being formed from a single piece of material and the first and second slots being fixed relative to one another, the first slot for receiving the first lap belt portion and the second slot for receiving the first shoulder belt portion, the second belt attaching plate being formed from a single piece of material and the third and fourth slots being fixed relative to one another, the third slot for receiving the second lap belt portion and the fourth slot for receiving the second shoulder belt portion; and a crotch belt, a first end of the crotch belt being attached relative to the seat and a second end of the crotch belt being attached to a crotch belt attaching plate that includes structure for interlocking with the buckle assembly for securing the crotch belt to the buckle assembly.

22. The vehicle occupant protection device of claim 21 wherein the structure of the crotch belt attaching plate defines an opening for receiving the tongue of the tongue portion of the buckle assembly prior to the tongue being received and latched in the buckle, the structure securing the crotch belt attaching plate to the buckle assembly when the tongue is latched in the buckle.

23. The vehicle occupant protection device of claim 21 wherein the buckle of the buckle assembly includes an interlocking portion, the structure of the crotch belt attaching plate includes a corresponding interlocking portion for cooperating with the interlocking portion of the buckle for securing the crotch belt attaching plate to the buckle assembly.

24. The vehicle occupant protection device of claim 23 wherein the interlocking portion of the buckle includes a passageway, the corresponding interlocking portion of the crotch belt attaching plate including at least one locking arm that is adapted to be received and latched in the passageway of the buckle for securing the crotch belt attaching plate to the buckle assembly.

25. A vehicle occupant protection device for helping to protect an occupant of a seat of a vehicle, the vehicle occupant protection device comprising:
    first and second lap belt portions for collectively extending across a lap portion of the occupant, the first lap belt extending from a first side of the seat and the second lap belt extending from a second side of the seat;
    first and second shoulder belt portions for extending over first and second shoulders, respectively, of the occupant; and
    a buckle assembly for interconnecting the first and second lap belt portions and the first and second shoulder belt portions,
    the buckle assembly including a buckle portion through which first and second slots extend and a tongue portion through which third and fourth slots extend, the first slot for receiving the first lap belt portion and the second slot for receiving the first shoulder belt portion, the third slot for receiving the second lap belt portion and the fourth slot for receiving the second shoulder belt portion,
    the first and second slots being elongated and the second slot being fixed relative to and extending away from the first slot in a direction such that an angle in a range of ninety-five to one hundred and twenty degrees is defined between the first and second slots, the third and fourth slots also being elongated and the fourth slot being fixed relative to and extending away from the third slot in a direction such that substantially the same angle is defined between the third and fourth slots.

26. The vehicle occupant protection device of claim 25 wherein the buckle portion of the buckle assembly includes a first belt attaching plate and a buckle, the first and second slots extending through the first belt attaching plate, the tongue portion of the buckle assembly further including a second belt attaching plate and a tongue, the third and fourth slots extending through the second belt attaching plate.

27. The vehicle occupant protection device of claim 26 wherein the tongue portion, including the tongue and the second belt attaching plate, is formed from a single piece of material and not from multiple pieces of material secured together.

28. The vehicle occupant protection device of claim 25 wherein, when the tongue portion is secured to the buckle portion, the first slot of the buckle portion extends in a direction parallel to the third slot of the tongue portion.

29. The vehicle occupant protection device of claim 25 wherein the first and second shoulder belt portions are adapted to extend upwardly from the buckle assembly, when the tongue portion is secured to the buckle portion, at an angle in a range of five to thirty degrees from an imaginary vertical reference line that extends through the buckle assembly.

30. The vehicle occupant protection device of claim 29 wherein the first and second lap belt portions are adapted to extend downwardly from the buckle assembly, when the tongue portion is secured to the buckle portion, at an angle in a range of forty-five to ninety degrees from an imaginary horizontal reference line that extends through the buckle assembly in a longitudinal direction relative to the vehicle.

31. A vehicle occupant protection device for helping to protect an occupant of a seat of a vehicle, the vehicle occupant protection device comprising:
    first and second lap belt portions for collectively extending across a lap portion of the occupant, the first lap belt extending from a first side of the seat and the second lap belt extending from a second side of the seat;
    first and second shoulder belt portions for extending over first and second shoulders, respectively, of the occupant;
    a buckle assembly for interconnecting the first and second lap belt portions and the first and second shoulder belt portions, the buckle assembly including a buckle portion and a tongue portion, the tongue portion including a laterally extending tongue and the buckle portion including a buckle for receiving and latching the tongue of the tongue portion for securing the tongue portion to the buckle portion, the tongue being located in a plane, the buckle including a release mechanism that is actuatable for unlatching the tongue from the buckle, the release mechanism including a push button actuator that moves linearly in a direction parallel to the plane of the tongue for actuating the release mechanism to unlatch the tongue from the buckle; and
    a crotch belt, a first end of the crotch belt being attached relative to the seat and a second end of the crotch belt being attached to a crotch belt attaching plate that includes structure for interlocking with the buckle assembly for securing the crotch belt to the buckle assembly,
    the buckle assembly including first and second belt attaching plates, the buckle portion including the first belt attaching plate and the tongue portion including the second belt attaching plate, the structure of crotch belt attaching plate including a plate portion having first and second slots, the first slot adapted to receive a portion of the first belt attaching plate and the second slot adapted to receive a portion of the second belt attaching plate for securing the crotch belt attaching plate to the buckle assembly.

32. The vehicle occupant protection device of claim 31 wherein the first and second belt attaching plates include locking mechanisms for locking the crotch belt attaching plate relative to the buckle assembly, the locking mechanisms being actuatable for releasing the crotch belt attaching plate from the buckle assembly.

33. A vehicle occupant protection device for helping to protect an occupant of a seat of a vehicle, the vehicle occupant protection device comprising:
    first and second lap belt portions for collectively extending across a lap portion of the occupant, the first lap belt extending from a first side of the seat and the second lap belt extending from a second side of the seat;

first and second shoulder belt portions for extending over first and second shoulders, respectively, of the occupant;

a buckle assembly for interconnecting the first and second lap belt portions and the first and second shoulder belt portions, the buckle assembly including a buckle portion and a tongue portion, the tongue portion including a laterally extending tongue and the buckle portion including a buckle for receiving and latching the tongue of the tongue portion for securing the tongue portion to the buckle portion, the tongue being located in a plane, the buckle including a release mechanism that is actuatable for unlatching the tongue from the buckle, the release mechanism including a push button actuator that moves linearly in a direction parallel to the plane of the tongue for actuating the release mechanism to unlatch the tongue from the buckle; and a crotch belt, a first end of the crotch belt being attached relative to the seat and a second end of the crotch belt being attached to a crotch belt attaching plate that includes structure for interlocking with the buckle assembly for securing the crotch belt to the buckle assembly, the buckle assembly including first and second belt attaching plates, the buckle portion including the first belt attaching plate having a first protrusion, the tongue portion including the second belt attaching plate having a second protrusion, the structure of crotch belt attaching plate including at least one hooked portion for extending over the first and second protrusions for securing the crotch belt attaching plate to the buckle assembly.

34. A vehicle occupant protection device for helping to protect an occupant of a seat of a vehicle, the vehicle occupant protection device comprising:

first and second lap belt portions for collectively extending across a lap portion of the occupant, the first lap belt extending from a first side of the seat and the second lap belt extending from a second side of the seat;

first and second shoulder belt portions for extending over first and second shoulders, respectively, of the occupant;

a buckle assembly for interconnecting the first and second lap belt portions and the first and second shoulder belt portions, the buckle assembly including a buckle portion and a tongue portion, the tongue portion including a laterally extending tongue and the buckle portion including a buckle for receiving and latching the tongue of the tongue portion for securing the tongue portion to the buckle portion, the tongue being located in a plane, the buckle including a release mechanism that is actuatable for unlatching the tongue from the buckle, the release mechanism including a push button actuator that moves linearly in a direction parallel to the plane of the tongue for actuating the release mechanism to unlatch the tongue from the buckle; and a crotch belt, a first end of the crotch belt being attached relative to the seat and a second end of the crotch belt being attached to a crotch belt attaching plate that includes structure for interlocking with the buckle assembly for securing the crotch belt to the buckle assembly, the buckle of the buckle assembly including an interlocking portion, the structure of the crotch belt attaching plate including corresponding interlocking portion for cooperating with the interlocking portion of the buckle for securing the crotch belt attaching plate to the buckle assembly, the interlocking portion of the buckle including a passageway, the corresponding interlocking portion of the crotch belt attaching plate including at least one locking arm that is adapted to be received and latched in the passageway of the buckle for securing the crotch belt attaching plate to the buckle assembly, the corresponding interlocking portion of the crotch belt attaching plate including a release mechanism for unlatching the corresponding interlocking portion from the passageway.

35. A vehicle occupant protection device for helping to protect an occupant of a seat of a vehicle, the vehicle occupant protection device comprising:

first and second lap belt portions for collectively extending across a lap portion of the occupant, the first lap belt extending from a first side of the seat and the second lap belt extending from a second side of the seat;

first and second shoulder belt portions for extending over first and second shoulders, respectively, of the occupant;

a buckle assembly for interconnecting the first and second lap belt portions and the first and second shoulder belt portions, the buckle assembly including a buckle portion and a tongue portion, the tongue portion including a laterally extending tongue and the buckle portion including a buckle for receiving and latching the tongue of the tongue portion for securing the tongue portion to the buckle portion, the tongue being located in a plane, the buckle including a release mechanism that is actuatable for unlatching the tongue from the buckle, the release mechanism including a push button actuator that moves linearly in a direction parallel to the plane of the tongue for actuating the release mechanism to unlatch the tongue from the buckle; and a crotch belt, a first end of the crotch belt being attached relative to the seat and a second end of the crotch belt being attached to a crotch belt attaching plate that includes structure for interlocking with the buckle assembly for securing the crotch belt to the buckle assembly, the buckle of the buckle assembly including an interlocking portion, the structure of the crotch belt attaching plate including a corresponding interlocking portion for cooperating with the interlocking portion of the buckle for securing the crotch belt attaching plate to the buckle assembly, the interlocking portion of the buckle including one of an outwardly extending locking pin and an aperture adapted for receiving the locking pin, the corresponding interlocking portion of the crotch belt attaching plate being a plate portion having the other of the outwardly extending locking pin and the aperture adapted for receiving the locking pin.

36. A vehicle occupant protection device for helping to protect an occupant of a seat of a vehicle, the vehicle occupant protection device comprising:

first and second lap belt portions for collectively extending across a lap portion of the occupant, the first lap belt extending from a first side of the seat and the second lap belt extending from a second side of the seat;

first and second shoulder belt portions for extending over first and second shoulders, respectively, of the occupant;

a buckle assembly for interconnecting the first and second lap belt portions and the first and second shoulder belt portions, the buckle assembly including a buckle portion and a tongue portion, the tongue portion including a laterally extending tongue and the buckle portion including a buckle for receiving and latching the tongue of the tongue portion for securing the tongue portion to the buckle portion, the tongue being located in a plane, the buckle including a release mechanism that is actuatable for unlatching the tongue from the buckle, the release mechanism including a push button actuator that moves linearly in a direction parallel to the plane of the tongue for actuating the release mechanism to unlatch the tongue from the buckle; and a crotch belt, a first end of the crotch belt being attached relative to the seat and a second end of the crotch belt being attached to a crotch belt attaching plate that includes structure for interlocking with the buckle assembly for securing the crotch belt to the buckle assembly, wherein the crotch belt attaching plate may be unlatched from the buckle assembly without unlatching the tongue portion of the buckle assembly from the buckle portion of the buckle assembly.

37. A vehicle occupant protection device for helping to protect an occupant of a seat of a vehicle, the vehicle occupant protection device comprising:

first and second lap belt portions for collectively extending across a lap portion of the occupant, the first lap belt extending from a first side of the seat and the second lap belt extending from a second side of the seat;

first and second shoulder belt portions for extending over first and second shoulders, respectively, of the occupant;

a buckle assembly for interconnecting the first and second lap belt portions and the first and second shoulder belt portions; and a crotch belt, a first end of the crotch belt being attached relative to the seat and a second end of the crotch belt being attached to a crotch belt attaching plate that includes structure for interlocking with the buckle assembly for securing the crotch belt to the buckle assembly, the buckle assembly including first and second belt attaching plates, the buckle portion including the first belt attaching plate and the tongue portion including the second belt attaching plate, the structure of crotch belt attaching plate including a plate portion having first and second slots, the first slot adapted to receive a portion of the first belt attaching plate and the second slot adapted to receives a portion of the second belt attaching plate for securing the crotch belt attaching plate to the buckle assembly.

38. The vehicle occupant protection device of claim 37 wherein the first and second belt attaching plates include locking mechanisms for locking the crotch belt attaching plate relative to the buckle assembly, the locking mechanisms being actuatable for releasing the crotch belt attaching plate from the buckle assembly.

39. A vehicle occupant protection device for helping to protect an occupant of a seat of a vehicle, the vehicle occupant protection device comprising:

first and second lap belt portions for collectively extending across a lap portion of the occupant, the first lap belt extending from a first side of the seat and the second lap belt extending from a second side of the seat;

first and second shoulder belt portions for extending over first and second shoulders, respectively, of the occupant;

a buckle assembly for interconnecting the first and second lap belt portions and the first and second shoulder belt portions; and a crotch belt, a first end of the crotch belt being attached relative to the seat and a second end of the crotch belt being attached to a crotch belt attaching plate that includes structure for interlocking with the buckle assembly for securing the crotch belt to the buckle assembly, the buckle assembly including first and second belt attaching plates, the buckle portion including the first belt attaching plate having a first protrusion, the tongue portion including the second belt attaching plate having a second protrusion, the structure of crotch belt attaching plate including at least one hooked portion for extending over the first and second protrusions for securing the crotch belt attaching plate to the buckle assembly.

40. A vehicle occupant protection device for helping to protect an occupant of a seat of a vehicle, the vehicle occupant protection device comprising:

first and second lap belt portions for collectively extending across a lap portion of the occupant, the first lap belt extending from a first side of the seat and the second lap belt extending from a second side of the seat;

first and second shoulder belt portions for extending over first and second shoulders, respectively, of the occupant;

a buckle assembly for interconnecting the first and second lap belt portions and the first and second shoulder belt portions; and a crotch belt, a first end of the crotch belt being attached relative to the seat and a second end of the crotch belt being attached to a crotch belt attaching plate that includes structure for interlocking with the buckle assembly for securing the crotch belt to the buckle assembly, the buckle of the buckle assembly including an interlocking portion, the structure of the crotch belt attaching plate including a corresponding interlocking portion for cooperating with the interlocking portion of the buckle for securing the crotch belt attaching plate to the buckle assembly, the interlocking portion of the buckle including a passageway, the corresponding interlocking portion of the crotch belt attaching plate including at least one locking arm that is adapted to be received and latched in the passageway of the buckle for securing the crotch belt attaching plate to the buckle assembly, the corresponding interlocking portion of the crotch belt attaching plate including a release mechanism for unlatching the corresponding interlocking portion from the passageway.

41. A vehicle occupant protection device for helping to protect an occupant of a seat of a vehicle, the vehicle occupant protection device comprising:

first and second lap belt portions for collectively extending across a lap portion of the occupant, the first lap belt extending from a first side of the seat and the second lap belt extending from a second side of the seat;

first and second shoulder belt portions for extending over first and second shoulders, respectively, of the occupant;

a buckle assembly for interconnecting the first and second lap belt portions and the first and second shoulder belt portions; and a crotch belt, a first end of the crotch belt being attached relative to the seat and a second end of the crotch belt being attached to a crotch belt attaching plate that includes structure for interlocking with the buckle assembly for securing the crotch belt to the buckle assembly, the buckle of the buckle assembly including an interlocking portion, the structure of the crotch belt attaching plate including a corresponding interlocking portion for cooperating with the interlocking portion of the buckle for securing the crotch belt attaching plate to the buckle assembly, the interlocking portion of the buckle including an outwardly extending locking pin, the corresponding interlocking portion of the crotch belt attaching plate being a plate portion having an aperture for receiving the locking pin for securing the crotch belt attaching plate to the buckle assembly.

42. A vehicle occupant protection device for helping to protect an occupant of a seat of a vehicle, the vehicle occupant protection device comprising:

first and second lap belt portions for collectively extending across a lap portion of the occupant, the first lap belt extending from a first side of the seat and the second lap belt extending from a second side of the seat;

first and second shoulder belt portions for extending over first and second shoulders, respectively, of the occupant;

a buckle assembly for interconnecting the first and second lap belt portions and the first and second shoulder belt portions; and a crotch belt, a first end of the crotch belt being attached relative to the seat and a second end of the crotch belt being attached to a crotch belt attaching plate that includes structure for interlocking with the buckle assembly for securing the crotch belt to the buckle assembly, wherein the crotch belt attaching plate may be unlatched from the buckle assembly without unlatching the tongue portion of the buckle assembly from the buckle portion of the buckle assembly.

* * * * *